3,039,831
INSULATED BUSHING
Paul P. Thomas, Detroit, Mich., assignor to American Metal Products Company, Detroit, Mich., a corporation of Michigan
Filed Aug. 9, 1957, Ser. No. 677,324
11 Claims. (Cl. 308—26)

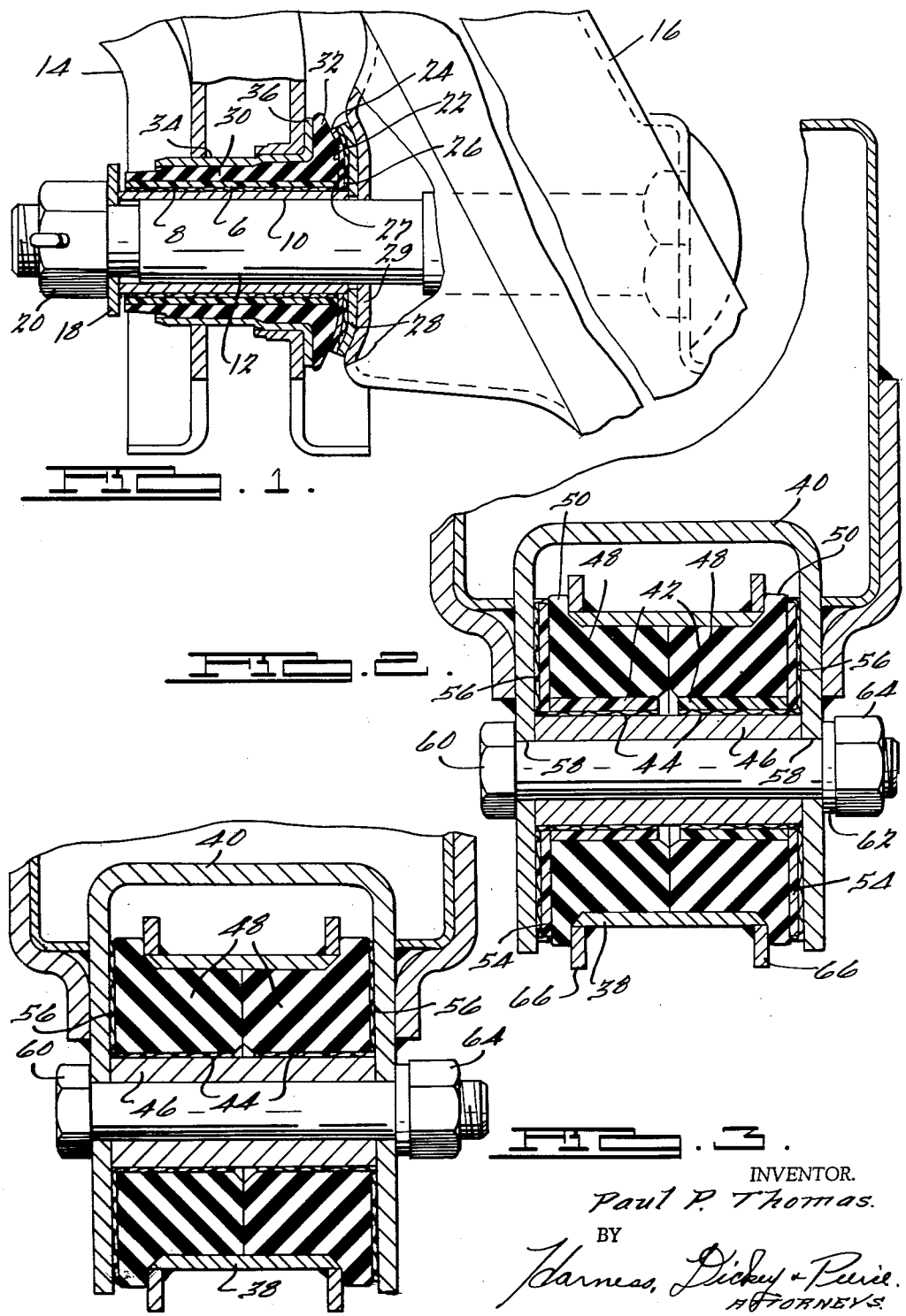

This invention relates to insulated bushings and particularly to an insulated bushing for pivotally connecting one member to another.

The main objects of the invention are to provide an insulated bushing for pivotally connecting one member to another in a manner to dampen vibration, reduce noise, compensate for misalignment, and absorb thrust loads; to provide an insulated bushing comprising a layer of low friction material conformed to a shaft by rubber backing material to provide a low friction bearing surface; to provide an insulated bushing comprising a sleeve of hardenable backing material having a layer of low friction material bonded to the inner surface thereof and surrounded by a rubber backing material; to provide an insulated bushing which is relatively inexpensive, easy to assemble, and rugged and effective in use.

Other objects and features of novelty of the invention will be specifically pointed out or otherwise become apparent when referring, for a better understanding of the invention, to the following description taken in conjunction with the accompanying drawing, wherein:

FIGURE 1 is a broken sectional view of an insulated bushing embodying features of the invention;

FIG. 2 is a broken sectional view of an insulated bushing illustrating another form of the invention; and FIG. 3 is a broken sectional view of a structure similar to that of FIG. 2 illustrating still another form of the invention.

Referring to FIG. 1, an insulated bushing embodying features of the invention is comprised of a sleeve 6 made of hardenable backing material having a layer of Teflon or other low friction material 8 bonded to the inner surface thereof. The sleeve 6 is disposed over a sleeve bearing 10 which in turn extends over a bolt 12 which fastens a leg 14 of an A-frame, for example, to a portion of chassis frame 16 of an automotive vehicle.

It will be observed that the sleeve bearing 10 is clamped tight between the chassis frame 16 and a washer 18 by a nut 20 screwed onto the end of the bolt 12. An end washer 22 comprised of a backing material 24 having a layer of Teflon or other low friction material 26 bonded to the surface thereof bears against a smooth plated surface 27 of a washer 28 abutting against wall 29 of the chassis frame 16. The bearing surface between the washers 22 and 28 reduces the friction at this point.

A rubber sleeve 30 having a radially flanged end portion 32 is disposed over the sleeve 6, and a sleeve 34 having a flange 36 on one end thereof is disposed within an aperture in the leg 14 of the A-frame and over the rubber sleeve 30 to compress and retain the rubber so that it provides a resilient backing material for the washer 22 and the sleeve 6.

Reference is made to the copending application of Charles S. White, Serial No. 619,782, filed November 1, 1956, now abandoned, for a complete and full description of the procedure and materials for making the sleeve 6 and the end washer 22 with the layer of low friction material bonded to the face thereof.

The other leg of the A-frame (not shown) is similarly connected to another portion of the chassis frame 16 so that both legs are pivotally connected to the chassis frame, the front wheel of an automotive vehicle being supported on the pivoting end of the A-frame. If the A-frame is urged to the right, as viewed in FIG. 1, the washer 22 provides a bearing surface for restricting this movement, whereas if the A-frame is urged to the left, a similar end washer disposed on the left side of the other leg (not shown) restrains the movement to the left. Therefore, a bearing surface need not be provided adjacent the washer 18.

By this construction, the layer of low friction material 8 provides a bearing surface for engaging the sleeve bearing 10 and the rubber backing sleeve 30 provides a resilient backing to dampen vibrations, compensate for slight misalignment, and absorb thrust loads. It will be observed that no torque loads are impressed upon the rubber backing sleeve 30 other than the friction of the bearing surface between the layer of low friction material 8 and the bearing sleeve 10.

Referring to FIG. 2, another form of the invention is illustrated wherein a member 38 is pivotally connected to a bracket 40 mounted on the chassis frame by welding or other suitable means. Two sleeves 42 made from the same material as the sleeve 6 of FIG. 1, have a layer of Teflon or other low friction material 44 bonded to the inner surface thereof for providing a bearing surface for engaging a sleeve bearing 46. Two rubber backing rings 48 having annular flanges 50 on opposite ends thereof are disposed over the sleeve 42 and clamped by the member 38. As in FIG. 1, the rubber rings 48 are maintained under compression by the member 38 and the amount of compression can be varied to obtain the desired firmness and dampening effect.

End washers 54 are provided on either end of the sleeve 46 and are made of the same material as the end washer 22 of FIG. 1 with a layer of Teflon or other low friction material 56 bonded to the one face thereof. The entire assembly is then positioned within the bracket 40 so that the aperture in the sleeve 46 is aligned with apertures 58 in the frame 40 and a bolt 60 is passed therethrough and retained in position by a washer 62 and nut 64. Flanges 66 are provided on the member 38 to provide a backing for the flanges 50 of the rubber rings 48 so that these portions are maintained under compression to provide a better backing for the periphery of the end washers 54.

In this manner the member is connected to the bracket 40 so that it can pivot about the bearing surface provided between the layer of low friction material 44 and the sleeve bearing 46, with the layer of low friction material 56 of the end washers 54 providing low friction surfaces for bearing against the sides of the bracket 40. The surface finish of the sides of the bracket should be such as to provide a smooth running surface, and if desired, separate washers with a suitable finish similar to washer 28 of FIG. 1 can be placed between the low friction material 56 and the bracket sides to provide the smooth running surfaces.

As previously described, the rubber backing rings 48 will dampen vibrations, reduce noise, compensate for slight misalignment, and absorb thrust loads. Also, as previously described, because of the bearing surface provided with the sleeve bearing 46, there will be no torque loads applied to the rubber rings 48 other than that caused by the friction between the bearing surfaces. As a result, the life of the rubber is greatly prolonged. Further, by virtue of the split rubber ring construction, the entire assembly can be quickly and easily put together and mounted within the bracket 40 to form a rugged and economical structure. The member 38 can be a separate element pivotally connected to the bracket, or it can serve as a clamping ring upon which the member that is desired to be pivotally connected to the bracket can be rigidly secured.

If desired, the sleeves 42 and rubber rings 48 illustrated in FIG. 2 can have mating axial grooves therein to prevent relative rotation therebetween, or they can be bonded together by conventional methods. However, for most applications the friction between the rubber rings and sleeves 42 is enough to prevent rotation therebetween because the rubber is under compression, and the only torque applied is the small amount caused by the friction of the bearing surface between the layers of low friction material 44 and the sleeve bearing 46.

Referring to FIG. 3, another form of the invention is illustrated which is similar to that illustrated in FIG. 2 with the exception that the sleeves 42 are not used and the layers of Teflon or other low friction material 44 and 56 are bonded directly to the surfaces of the rubber backing rings 48. The sleeve bearing 46 and member 38 are employed as previously described and positioned within the bracket 40 by the bolt 60 and nut 64. The compression of the rubber rings 48 maintains complete surface engagement between the layers of low friction material and the sleeve bearing 46 and side walls of the frame 40.

For some applications the compression of the rubber is sufficient to retain the layers of low friction material in place without requiring that it be bonded to the rubber. When this is done the low friction material may be in any suitable form such as in sheets or woven cloth. However, when the low friction material is bonded to the backing, it is made of woven cloth with a layer of bondable material woven on the one face thereof to facilitate the bonding to the rubber. Reference is made to the aforesaid copending application of Charles S. White for a complete and full description of bonding such a layer of woven low friction material to backing materials.

It is, of course, apparent from the above description that the sleeve 6 of FIG. 1 can also be eliminated so that the layer of low friction material 8 is in direct contact with the rubber backing 30 similar to that illustrated in FIG. 3.

What is claimed is:

1. An insulated bushing for pivotally connecting the legs of a control arm to a chassis frame of an automotive vehicle, which includes the combination of, a control arm, a stud projecting from a surface of the chassis frame and extending through an aperture in one of the legs of said control arm, a smooth finished washer disposed over said stud and against said surface of the chassis frame, a sleeve bearing disposed over the stud and clamped between the smooth finished washer and a nut screwed onto the projecting end of the stud in a manner to clamp the smooth finished washer against the chassis frame, a layer of low friction material encircling said sleeve bearing, a rubber backing sleeve encircling said layer of low friction material, an outer sleeve disposed about the rubber sleeve so as to place it under compression and conform the layer of low friction material to the surface of said bearing sleeve, said outer sleeve being mounted within said aperture in the leg of the control arm, and an end washed disposed between the end of the rubber sleeve and said smooth finished washer, said end washer having a layer of low friction material secured to the face thereof engaging the smooth finished washer.

2. The invention as defined in claim 1 wherein the end of the rubber sleeve and clamping sleeve adjacent to the chassis frame are radially flanged to provide additional resilient backing material for said end washer.

3. An insulated inner bushing assembly for pivotally connecting an arm to a shaft comprising an inner metal sleeve, a sleeve of low friction material completely encircling said inner sleeve, an outer metal sleeve encircling and spaced from said inner sleeve, a compressed resilient bushing completely filling the space between said inner and outer sleeves and accurately conforming the sleeve of low friction material to the surface of said inner sleeve to provide a low friction surface between said resilient bushing and the inner sleeve, a supporting shaft projecting through said inner sleeve, means for fixing said inner sleeve against movement relative to said supporting shaft, and an arm fixed to said outer sleeve for pivotal movement about said inner sleeve.

4. The invention as defined in claim 3, wherein a hardened resin bushing is positioned between said resilient bushing and sleeve of low friction material and the latter is secured to the hardened resin bushing.

5. An insulated bushing for pivotally connecting the legs of a control arm to a chassis frame of an automotive vehicle, which includes the combination of, a control arm, a shaft projecting from the surface of a chassis frame of the automotive vehicle and extending through an aperture in one of the legs of said control arm, an inner metal sleeve disposed over said shaft, a sleeve of low friction material disposed over said inner sleeve, an outer metal sleeve encircling and spaced from said inner sleeve and fixed within the said aperture of the control arm, a compressed rubber bushing completely filling the space between said inner and outer sleeves and accurately conforming the sleeve of low friction material to the surface of said inner sleeve to provide a low friction surface between said rubber bushing and inner sleeve, a layer of low friction material secured to the end of said rubber bushing adjacent to said chassis frame and slidably bearing against said chassis frame to limit movement of said control arm toward said chassis frame, and means for fixing said inner sleeve against movement relative to said shaft.

6. An insulated bushing for pivotally connecting the legs of a control arm to a chassis frame of an automotive vehicle, which includes the combination of, a control arm, a bolt projecting from the surface of the chassis frame and extending through an aperture in one of the legs of said control arm, a metal sleeve bearing disposed over the bolt and clamped against the chassis frame by a nut on the end of the bolt, a sleeve of low friction material disposed over said sleeve bearing, a rubber sleeve disposed over said sleeve of low friction material, an outer metal sleeve encircling and compressing said rubber sleeve and fixed within said aperture in the control arm, and an end washer disposed over said bolt between the end of the rubber sleeve and the chassis frame, said end washer having a layer of low friction material secured to the face thereof slidably engaging a smooth running surface on said chassis frame to enable the rubber bushing to resiliently resist axial movement of the control arm towards said chassis frame without inducing torque into the rubber sleeve.

7. The invention as defined in claim 6, wherein said smooth running surface on said chassis frame is provided by a smooth finished washer disposed over said stud between the chassis frame and said end washer and clamped against the chassis frame by the end of said sleeve bearing.

8. An insulating bushing for pivotally connecting an arm to a bracket comprising a bracket having parallel spaced apart walls with aligned apertures therein, a bolt extending through the said apertures, an inner metal sleeve disposed over said bolt and clamped between said walls, a sleeve of low friction material encircling said inner sleeve, an outer metal sleeve encircling and spaced from said inner sleeve, a compressed resilient resin material completely filling the space between said inner and outer sleeve members and accurately conforming the sleeve of low friction material to the surface of said inner sleeve, and washer shaped layers of low friction material positioned between said walls and the ends of said resin material adjacent thereto to provide a low friction bearing surface therebetween whereby the arm can be clamped on said outer sleeve for pivotal connection to said bracket.

9. The invention as defined in claim 8 wherein the ends of said resin material are flanged to extend between the walls and the ends of said outer sleeve to provide additional resilient backing material for said washer shaped layers of low friction material.

10. An insulated bushing for pivotally connecting a member to a bracket comprising a bracket having parallel spaced apart walls with aligned apertures therein, an inner metal sleeve extending between said walls and aligned with said apertures, a bolt extending through said apertures and inner sleeve and clamping the inner sleeve between said walls, a pair of hardened resin sleeves having a sleeve of low friction material secured to the inner surfaces thereof disposed over said inner sleeve, a pair of rubber rings disposed over said hardened sleeves, an outer metal sleeve clamped around the rubber rings to place them under compression to resiliently urge the low friction material against said inner sleeve, and washer shaped low friction material positioned between each of said walls and the end of the rubber ring adjacent thereto to provide a low friction bearing surface therebetween whereby the arm can be clamped to said outer sleeve for pivotal connection to said bracket.

11. The invention as defined in claim 10 wherein the ends of each of said rubber rings adjacent to the walls of the bracket are radially flanged to provide additional resilient backing material for said washer shaped layers of low friction material.

References Cited in the file of this patent

UNITED STATES PATENTS

| | | |
|---|---|---|
| 1,913,513 | Rossman et al. | June 13, 1933 |
| 2,238,197 | Watson | Apr. 15, 1941 |
| 2,465,785 | Berno | Mar. 29, 1949 |
| 2,715,617 | White | Aug. 16, 1955 |
| 2,804,886 | White | Sept. 13, 1957 |
| 2,827,303 | Herbenar | Mar. 18, 1958 |
| 2,885,248 | White | May 5, 1959 |
| 2,907,612 | White | Oct. 6, 1959 |